United States Patent [19]

O'Blasny et al.

[11] 4,140,212

[45] Feb. 20, 1979

[54] CYCLONIC DISTILLATION TOWER FOR WASTE OIL REREFINING PROCESS

[75] Inventors: Richard H. O'Blasny, Overland Park; Timothy F. Sparks, Prairie Village; Timothy J. Tierney, Overland Park; John S. Hunter, Wichita, all of Kans.

[73] Assignee: Vacsol Corporation, Kansas City, Kans.

[21] Appl. No.: 826,066

[22] Filed: Aug. 19, 1977

[51] Int. Cl.$^2$ .......................... B01D 3/10; C10G 7/00
[52] U.S. Cl. .................................... 196/114; 196/121; 196/127; 196/128; 202/205; 202/234; 202/236; 208/184; 208/359; 208/366
[58] Field of Search ............... 208/184, 340, 361, 366, 208/367, 359; 203/90, 91; 202/205, 206; 196/128, 114, 127

[56] References Cited

U.S. PATENT DOCUMENTS

| | | | |
|---|---|---|---|
| 2,357,829 | 9/1944 | Ittner | 202/236 |
| 2,451,668 | 10/1948 | Egger et al. | 208/184 |
| 2,610,142 | 9/1952 | Lawrence | 203/91 |
| 2,843,534 | 7/1958 | Harper | 202/236 |
| 2,897,147 | 7/1959 | Lely et al. | 208/366 |
| 2,952,632 | 9/1960 | Oertling | 208/361 |
| 3,080,300 | 3/1963 | Smith | 202/205 |
| 3,503,854 | 3/1970 | Good | 202/236 |
| 3,791,965 | 2/1974 | Fitzsimons et al. | 208/184 |

Primary Examiner—Herbert Levine
Attorney, Agent, or Firm—Schmidt, Johnson, Hovey & Williams

[57] ABSTRACT

A simplified, essentially maintenance-free yet highly efficient distillation tower and method for waste oil rerefining is provided which allows direct vacuum distillation of additive-supplemented waste oils without chemical pretreatment thereof and yields a highly refined intermediate oil suitable for immediate use or final polishing, along with a valuable bottoms fraction usable in greases or asphalts, for example. The tower includes an upright, cylindrical chamber with a tangential waste oil inlet and cooperating internal baffle for creating a whirling oil flow pattern therewithin, along with means for maintaining the proper temperature conditions within the tower for maximizing vaporization and recovery of hydrocarbons from the waste oil while also preventing undesirable decomposition or cracking of the oil. In preferred forms, temperature maintenance is effected by heating the walls of the tower through the use of heating tape or plate coils; however, this same result can be achieved by flooding the tower with an excess of waste oil whereby the chamber is heated by the presence of the excess hot oil. The tower also preferably includes an apertured partition dividing the chamber into adjacent subchambers, along with a pressure-equalizing conduit in communication with the respective subchambers; this construction facilitates rapid and effective separation of the tower bottoms during processing.

7 Claims, 5 Drawing Figures

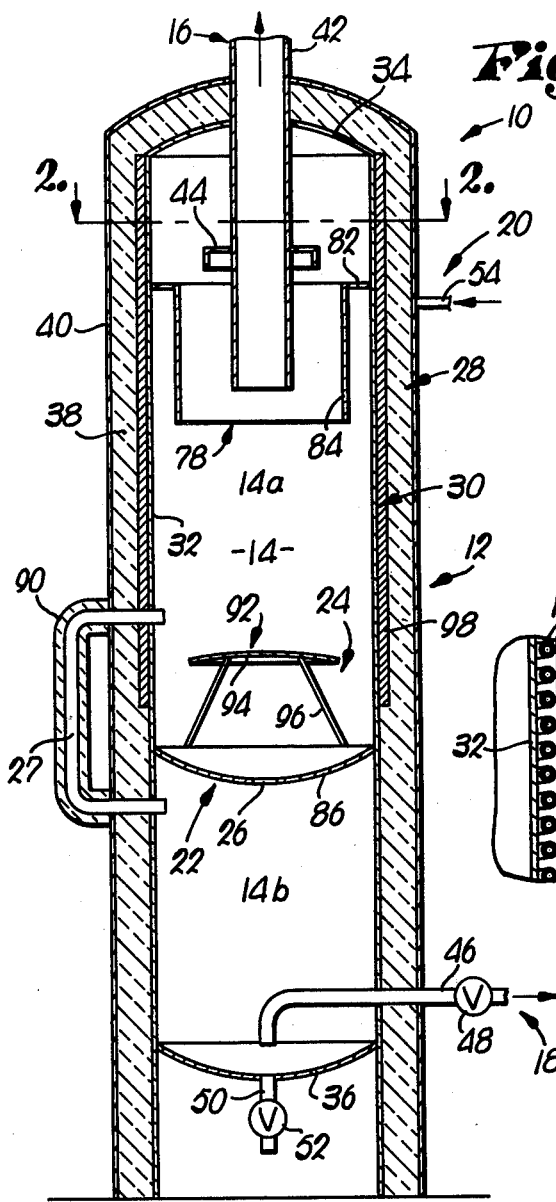
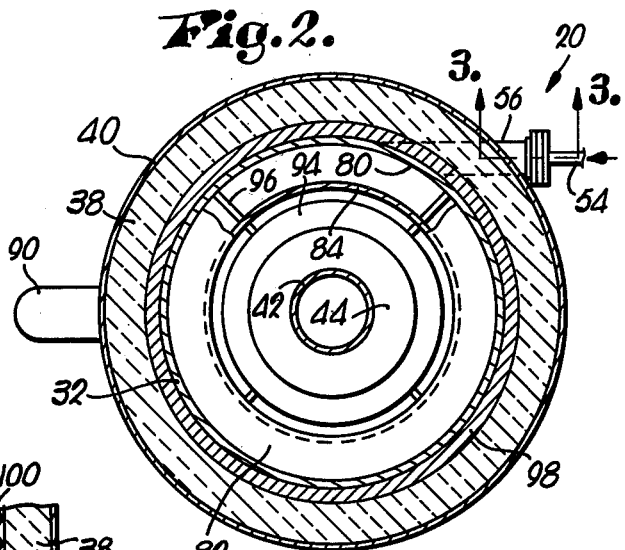
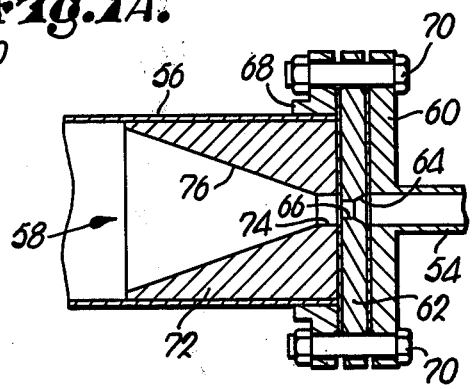
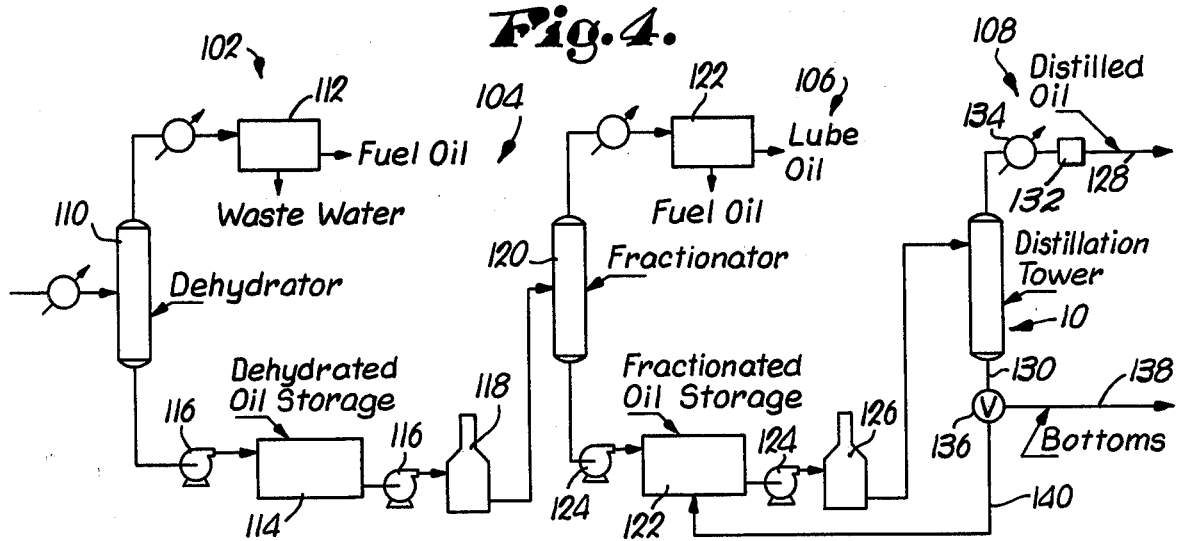

CYCLONIC DISTILLATION TOWER FOR WASTE OIL REREFINING PROCESS

This invention relates to a distillation tower and method especially adapted for use in rerefining modern-day additive-supplemented waste oils in a manner to achieve virtually quantitative recovery of salable products at relatively low operating costs and without complex and costly chemical pretreatment of the waste oil to be distilled. More particularly, it is concerned with such a tower and method wherein, in preferred forms, an upright, cylindrical, two-stage tower having a tangential waste oil inlet is provided, along with means for maintaining the temperature conditions within the tower during processing for maximizing vaporization of the hydrocarbons with a minimum of subsequent condensation thereof. This increases the yield of valuable hydrocarbons from the waste oil, while at the same time preventing undesirable decomposition or cracking of the oil. However, the tower and method hereof are not limited to rerefining of waste oil, but can be adapted for use in conjunction with various types of distillation processes and equipment, including the treatment of virgin oil and solvents, for example.

The waste oil rerefining industry has, in recent years, become only marginally profitable. The industry has suffered from a variety of ills, including relatively low product yields, low virgin oil prices, restrictive governmental policies in connection with rerefined oil, and increasingly stringent environmental pollution standards. These problems have been so severe that the rerefining industry in the United States has decreased from approximately 140 installations a few years ago to less than 30 today. This decline has occurred in spite of the fact that tremendous quantities of recoverable waste oil are produced annually in the United States. Thus, the United States has been in the unseemly position of paying exhorbitant prices for increasingly scarce virgin oil on the one hand, while literally throwing away extremely valuable and reusable waste oil on the other hand, simply because of a lack of means for efficiently and effectively rerefining the waste oil.

A number of waste oil rerefining methods have been proposed in the past. Principal among these are the socalled acid-clay, solvent extraction/acid-clay, IFP propane clarification, distillation/clay and hydrotreating processes. The acid-clay process has been used longer and is more widely accepted than perhaps any of the other methods used for rerefining used oils. In this process, the oil is first dehydrated and the light ends removed by fractionation. This treated oil is next contacted with sulfuric acid to remove a substantial proportion of the contaminants from the lube oil. The acid treated lube oil is then generally "polished" by contacting it with activated clay or diatomaceous earth for removing suspended carbon and the remaining acid. The most significant problem confronting rerefiners using this process is disposal of the "acid-sludge" generated by the acid treatment. Specifically, this waste material contains oil additives, ash, dirt and metals, sulfuric acid, and from 20 to 40% of the potentially reusable oil itself. As can be appreciated, this conglomeration presents severe problems from the standpoint of environmental pollution, therefore making disposal of the acid-sludge costly and time consuming. This, in addition to the fact that a significant quantity of the valuable and recoverable waste oil is lost through the process, has detracted from the usefulness of the acid-clay process.

The solvent extraction/acid-clay process is a relatively new concept and involves pretreatment of the dehydrated waste oil feed stock with relatively complex and costly solvents, followed by conventional acid treatment and clay contacting. While the solvent treatment increases product yields, the cost thereof is considerable and therefore little, if any, overall economy is realized.

IFP propane clarification is not in and of itself a complete rerefining process, but rather is a method of pretreating the dehydrated waste oil feed stock. The method generally involves propane extraction, propane separation, and propane recovery. In actual practice this method has not been widely followed, by virtue of the complexity of the concept and high costs, both in terms of original construction and in operation.

The distillation/clay process involves attempted removal of contaminants from a solvent-treated waste oil feed stream by means of vacuum distillation, followed by clay filtration as a polishing step. The primary problem with this process involves the distillation tower itself. Specifically, use of a conventional vacuum tower having internal trays or bubble caps quickly results in plugging of the tower. Of course, the inherent disadvantages described above of solvent pretreatment remain in this process.

Finally, hydrotreating or hydrofinishing involves a polishing step generally used in conjunction with one of the various rerefining methods. This polishing process involves passing a stream of oil and hydrogen over a catalytic bed to yield various grades of oil of good quality, with little or no waste. Notwithstanding the theoretically desirable results achievable with this process, it will be recognized that hydrotreating does nothing to eliminate the problems associated with treatment of the oil prior to polishing. Furthermore, the process requires significant amounts of hydrogen, and this normally requires a substantial capital expenditure or greatly increased operating costs. Moreover, use of hydrogen necessitates complicated handling and storage procedures, and creates safety hazards. Finally, the feed stream to the hydrotreating stage must be virtually free of contaminants such as metallic compounds and organic additives. Otherwise, these impurities may foul or destroy the expensive catalyst in the hydrotreating reactors, thus detracting from the quality of the end product and increasing maintenance expenses.

It is believed that a prime cause of many of the problems encountered with prior rerefining methods stems from the presence of complex additive packages in modern-day oils. For example, additives such as V.I. improvers, detergents and/or dispersants are believed to interfere with the usual chemical pretreatments, thus reducing the efficiency thereof.

In sum therefore, it will be appreciated that the prior methods of refining have been deficient in one or more critical respects. Thus, there is a real need in the art for a conceptual breakthrough which will solve the problems of cost, complexity, adverse environmental effects, and low yield in the rerefining industry.

The following patents are of background interest in connection with rerefining processes and equipment: U.S. Pat. Nos. 2,162,195, 2,529,310, 3,607,731, 3,620,967, 3,625,881, 3,639,229, 3,791,965, 3,879,282, 3,930,988, 2,645,607, 3,544,428, 1,586,376, 2,061,666, 2,330,326, 2,477,595, 1,345,452, 1,413,327, 1,518,684, 1,799,530, 2,023,205, 2,112,360, 1,988,773, 2,162,195, 3,639,229, 3,763,036 and 4,021,333.

It is therefore the most important object of the present invention to provide a distillation tower and method especially adapted for rerefining of modern-day additive supplemented waste oils and which achieve significant processing economies as compared with prior methods by virtue of virtually quantitative yield of salable products, simplicity of construction and operation, and elimination of environmental hazards, in order that rerefining of waste oils is rendered economically feasible and attractive. An additional object is to provide a novel distillation tower and method usable in processes other than waste oil rerefining, e.g., in treating virgin oil or solvent.

As a corollary to the foregoing, another object of the invention is to provide a distillation tower which preferably includes an elongated, cylindrical, enclosed chamber, means for supplying hot waste oil to the chamber, and for imparting a whirling motion to the oil within the chamber in order to enhance vaporization of a hydrocarbon fraction from the waste oil, along with means for maintaining the proper temperature conditions within the tower chamber, i.e., at a level for maintenance of a substantial fraction of the vaporized hydrocarbons in the vapor state, but below the temperature level sufficient to substantially decompose or crack the oil at the prevailing pressure conditions within the tower chamber; in alternate forms, the temperature-maintaining means can include peripheral wall heating apparatus such as electrical heating tape or conventional fluid heat-transfer apparatus, or appratus for flooding the chamber with an excess of hot waste oil during processing whereby the tower temperature conditions are maintained by virtue of the presence of the excess hot oil, and means for recycling at least a portion of the excess waste oil passing through the tower.

Another object of the invention is to provide a distillation tower which includes an elongated, upright chamber divided into respective, vertically adjacent first and second subchambers by means of an apertured partition, along with means for equalizing pressures within the subchambers so as to facilitate vapor-liquid separation within the tower.

Finally, another object of the invention is to provide a tower and method of the type described which include a tangentially disposed waste oil inlet adjacent the upper end thereof, along with internal baffle structure adjacent the tangential inlet for directing vaporized hydrocarbon and residual liquids around the confining sidewalls of the chamber and imparting a desirable whirling or cyclone motion thereto; in preferred forms, nozzle apparatus is provided within the inlet structure for spraying of the waste oil into the tower as this has been found important for maximum vaporization of hydrocarbons from the hot waste oil.

In the drawing:

FIG. 1 is a vertical sectional view of the preferred distillation tower in accordance with the invention;

FIG. 1A is a fragmentary sectional view of a tower similar to that illustrated in FIG. 1, but depicts the use of coil structure surrounding the chamber wall for temperature maintenance purposes;

FIG. 2 is a sectional view with parts broken away for clarity and taken along line 2—2 of FIG. 1;

FIG. 3 is an enlarged sectional view taken along line 3—3 of FIG. 1 and depicting the preferred oil inlet nozzle structure; and FIG. 4 is a schematic representation of the overall processing apparatus used in the preferred method hereof.

Referring now to the drawing, a distillation tower 10 is illustrated in FIG. 1. Broadly, tower 10 includes structure 12 serving to define an elongated, enclosed, upright chamber 14 having a first upper outlet 16 for vaporized hydrocarbons, along with a valve-controlled lower second outlet 18 for liquid bottoms. Means broadly referred to by numeral 20 is also provided for supplying hot waste oil to the chamber 14, and for imparting a whirling motion to the oil within the chamber 14 in order to enhance vaporization of hydrocarbons from the hot oil. In addition, an intermediate partition 22 is disposed within chamber 14 in order to divide the latter into first and second, vertically adjacent subchambers 14a and 14b. Means 24 for allowing flow of oil from the first to the second subchamber, and for equalizing pressures within the subchambers 14a and 14b, is also provided and includes a central aperture 26 through the partition 22, and a pressure equalizing conduit 27 respectively in communication with the first and second subchambers. Finally, means referred to by the numeral 28 is included for maintaining the temperature conditions within chamber 14, and particularly the upper first subchamber 14a thereof, at a level for maintaining a substantial fraction of vaporized hydrocarbons therein in the vapor state in order to promote efficient recovery thereof, but below the temperature level sufficient to substantially decompose or crack the oil at the prevailing pressure conditions within the chamber.

In more detail, the chamber-defining structure 12 includes an inner metallic shell 30 comprising an elongated, upright, tubular, circular cross section sidewall 32, along with concave top and bottom walls 34 and 36. Conventional thermal insulation 38 is disposed about the walls 32 and 34 in the manner shown, and an outer shell 40 is in covering relationship to the insulation 38. Shell 40 is of the same configuration as shell 30, as will be readily seen.

An elongated, centrally disposed, tubular pipe 42 extends through top wall 34 and downwardly into the upper subchamber 14a. Pipe 42 defines an outlet for vaporized hydrocarbons and is connected to conventional recovery apparatus to be described hereinafter. An annular baffle 44 is disposed about pipe 42 in order to deflect falling, condensed hydrocarbons within the upper subchamber to prevent entrainment thereof in the vaporized hydrocarbons entering pipe 42. Lower subchamber 14b is provided with a conventional bottoms outlet line 46 which is controlled by means of a valve 48. In addition, a secondary removal line 50 extends through bottom wall 36 and communicates with subchamber 14b, and is controlled by means of a valve 52.

Oil-supplying means 20 includes a delivery line 54 for conveying hot, dehydrated and previously fractionated waste oil to tower 10, in conjunction with an inlet pipe 56. As best seen in FIGS. 1 and 2, the pipe 54 and inlet 56 are disposed adjacent the upper end of subchamber 14a and are tangentially located relative to the sidewall 32. Referring specifically to FIG. 3, it will be seen that nozzle structure generally designated by the numeral 58 is provided with inlet pipe 56. In this connection, oil delivery pipe 54 is connected to a first plate 60 having a central opening therethrough of a diameter equal to that of the line 54. A second plate 62 is located adjacent plate 60 and is provided with a central bore therethrough having a frustoconical portion 64 and a communicating cylindrical portion 66 of reduced diameter relative to the line 54. Inlet pipe 54 on the other hand is provided with annular flange structure 68; and the plates 60, 62 are interconnected to the flange structure 68 by means of conventional bolts 70. Spray-forming apparatus in the form of a bored insert 72 is located within inlet pipe 54 adjacent the plate 62. Insert 72 is provided with an outwardly axially extending, cylindrical bore 74 of expanded diameter relative to the bore portion 66 of plate 60, along with an outwardly diverging, frustoconical bore 76. In this fashion, oil injected through the line 54 is in effect sprayed by means of the nozzle structure 58 through the inlet pipe 56 and thence into the interior of subchamber 14a. Of course, when tower 10 is operated under appropriate vacuum conditions, a large proportion of the sprayed waste oil is quickly or "flash" vaporized.

Internal, flow-directing, depending baffle structure 78 is located adjacent the internal inlet opening 80 defined by inlet pipe 56. Baffle structure 78 is of annular configuration and includes a radially extending connection lip 82, along with a depending circular wall portion 84 which is in spaced relationship to the sidewall 32 as best seen in FIG. 1. It will be understood that inlet pipe 56, nozzle structure 58 and baffle 78 cooperate during the operation of tower 10 for supplying oil to subchamber 14a, and imparting a whirling motion to the oil and vapors within the tower. This desirable whirling motion is assured by virtue of the tangential injection thereof and also because of the restricted annular passage defined between the sidewall 32 and baffle wall 84. Oil thus injected and directed (and the vapors evaporating therefrom) travel in a circular path down the sidewall 32. This is important for purposes to be made clear hereinafter.

Partition 22 is in the form of a concavo-convex plate 86 which includes a central oil flow aperture 26. The plate 86 serves to divide the overall chamber as noted above into subchambers 14a and 14b, and the aperture 26 allows flow of oil from first subchamber 14a into lower subchamber 14b. In addition to the foregoing, the somewhat C-shaped pressure equalization conduit 27 extends between the respective subchambers 14a and 14b and in effect bridges the partition 86. Conduit 27 is insulated as at 90 and is in the form of a simple, unobstructed tubular member serving to assure equal pressure conditions within the respective subchambers.

Vortex-breaking means 92 is located adjacent wall 86 and includes a circular, slightly downturned upper plate 94 supported by a plurality of circumferentially spaced legs 96 which are in turn connected to the sidewall 32. Vortex-breaking means 92 serves to prevent entrainment of nonvaporized bottoms in the vaporized hydrocarbons produced within subchamber 14a, and thus facilitates rapid and efficient separation of the vapor fraction from the bottoms liquid fraction.

Temperature-maintenance means 28 preferably includes apparatus for heating the defining sidewall of subchamber 14a. In the embodiment illustrated in FIGS. 1-3, conventional electrical heating tape 98 is provided around sidewall 32 for heating of the latter. Referring to FIG. 1A however, a second embodiment is illustrated where coil structure 100 is disposed about the wall 32. The coils are adapted to receive a fluid heat exchange media in the usual fashion. This may include a conventional heat exchange fluid or hot waste oil for example.

FIG. 4 is a schematic representation of the important components used in conjunction with tower 10 in a rerefining process. In this regard, the overall apparatus 102 includes a dehydration stage 104, a light ends removal stage 106, a distillation stage 108, and an optional finishing or polishing stage (not shown).

Dehydration stage 104 includes a conventional dehydrator 110 and the usual separation equipment 112 for separating waste water for recoverable light fuel oil. A dehydrated oil storage tank 114 is also provided along with the necessary pumps 116 and heater 118.

Light ends removal stage 106 is likewise conventional and includes a fractionation column 120. The overhead from column 120 feeds to separation equipment 122 for separating fuel oil and light ends. A fractionated oil storage tank 122, along with pumps 124 and heater 126, complete this stage.

Distillation stage 108 includes the tower 10, an overhead line 128, and a bottoms line 130. In most instances it is desirable to maintain vacuum conditions within tower 10, and for this purpose an appropriate vacuum pump 132 is operatively connected to tower 10. As will be more fully explained hereinafter, the overhead from tower 10 is condensed by means of a conventional condenser 134, and the distillate can either be used immediately or polished by known techniques. On the other hand, the bottoms line 130 is provided with a proportioning valve 136. Valve 136 is coupled to a bottoms recovery line 138, and to a recycle line 140 which leads back to fractionated oil storage tank 122. Line 140 and valve 136 are important for reasons to be made clear.

The operation of the overall rerefining apparatus 102, and particularly distillation tower 10 forming a part thereof, will now be described in detail. The following discussion pertains to the treatment of waste oil; however, it is to be understood that the tower and method hereof are not so limited, but can be used in a variety of separation processes. First of all, waste oil as received is first directed to dehydration stage 104, and particularly to dehydrator 110. In the dehydrator, the waste oil is heated to remove the water and a portion of the undesirable particulates such as dirt and suspended solids in the oil. Temperature conditions within dehydrator 110 would typically be within the range of from about 150 to 300° F., whereas pressure is generally maintained at atmospheric, but vacuum conditions could be employed. In any event, the overhead from the dehydrator comprising waste water and extremely light ends is directed to separator apparatus 112 for recovery of the hydrocarbon fraction. The bottoms from the dehydrator are sent to storage tank 114.

The essentially moisture-free oil from tank 114 is then heated in heater 118 to a temperature of from about 500 to 600° F. at a pressure of from about 3 to 5 p.s.i.g. Alternately, the fractionator can be under a vacuum. This heated oil is then fed to steam-fed fractionation column 120 forming a part of stage 106. In the fractionation column 120, from about 1 to 10% of the waste oil is steam stripped overhead as light ends. These light ends would typically include water, fuel oil, light lube oils (spindle oils) and noncondensable gases. Preferably, the overhead is fed to separation apparatus 122, where the light tube oils are condensed and recovered, and the fuel oil and water are condensed and subsequently gravity separated.

It will be appreciated that the steps involved in dehydration, stripping and heating of the waste oil in the stages 104 and 106 are essentially conventional, and those skilled in the art will understand that a number of possible variations can be made in the above described steps.

The bottoms from column 120 are first fed to storage tank 122, and thence to heater 126. At this point the dehydrated, stripped oil is heated to a temperature of from about 650 to 850° F., depending principally upon the characteristics of the oil itself. Pressure conditions within heater 126 are generaly from about 60 to 250 p.s.i.g.

In any event, the heated oil from the heater 126 is next fed to distillation tower 10, and particularly through line 54 to inlet 56. This oil, being under a positive pressure, is forced through the above described nozzle structure 58 so that the oil is in effect sprayed into subchamber 14a of the tower. This spraying, in conjunction with the vacuum conditions within the tower, is believed to cause essentially instantaneous or "flash" vaporization of a substantial portion of the entering waste oil. In this regard, from about 50 to 95%, or more preferably from about 85 to 95%, of the waste oil entering the tower is vaporized in this fashion. In addition, the tangential orientation of the inlet 56, in conjunction with baffle structure 78, assures that the vaporized hydrocarbons and residual liquids within the tower 10 follow a substantially circular whirling or cyclonic path of travel along the inner surface of circular sidewall 32. These components flow down sidewall 32 and, during such passage the residuals are thrown radially outwardly, impinge against the wall 32, and flow downwardly past vortex-breaking means 92 and through aperture 26 into lower subchamber 14b. At the same time, the whirling, vaporized hydrocarbons move generally towards the center of the tower 10 with a portion thereof striking plate 94 in order to "break" the vortex. The vapors are then drawn generally axially upwardly into pipe 42 for recovery. The structure 92 is thus effective for minimizing entrainment of the bottoms in the hydrocarbon vapors in the central area of subchamber 14a. The bottoms fraction passing into subchamber 14b comprises mainly extremely heavy hydrocarbons, metals, and other impurities. Even flow of the bottoms fraction into subchamber 14b is assured by virtue of the pressure equalization conduit 27. Finally, the valuable bottoms fraction is continuously withdrawn from chamber 14b through line 46.

During the above described vapor-liquid separation sequence, the heating means 28 is employed for heating the wall 32. This factor has been discovered to be very important in achieving the high distillate yields characteristic of the tower 10. In fact, it has been determined that without the temperature maintenance afforded through the use of electrical heating tape 98, or a functional equivalent thereof, an appreciable quantity of the vaporized hydrocarbons will be recondensed within chamber 14a prior to passage thereof through pipe 42 for recovery. This of course lessens the overall yield of distillate and is to be avoided. In practice when waste lubricating oil derived from crankcases or the like is being treated, the temperature of the waste oil directed to tower 10 should be at a level of from about 650 to 850° F., and the temperature of the vaporized hydrocarbons within subchamber 14a should be maintained at a level of from about 650 to 725° F. Under these circumstances, it is desirable to maintain the temperature of the tower sidewall at a level of from about 675 to 750° F. Furthermore, it is desirable to maintain the absolute pressure within the tower 10 at a level of from about 0.5 to 3 inches of mercury.

Although use of heating tape 98 is preferred, it will be understood that other expedients could be resorted to as long as temperature maintenance is achieved. For example, FIG. 1A illustrates the use of coil structure adapted to receive a separate heat exchange fluid or a portion of the incoming hot oil. In addition however, it is possible in certain instances to supply the necessary heat to distillation tower 10 without peripheral heating apparatus. Referring specifically to FIG. 4, it will be noted that the bottoms line 130 is provided with a proportioning valve 136 and recycle line 140 back to tank 122. In this regard, it is sometimes feasible to flood tower 10 with an excess of waste oil beyond the design capability thereof so that the temperature conditions in the tower are properly maintained simply by virtue of the presence of the excess hot oil. This flooding technique of course results in passage of the excess oil through tower 10 without complete distillation thereof. Accordingly, in order that the valuable oil fractions therein are not lost, it is advantageous to recycle the excess back to the tank 122 for ultimate recycling through the distillation tower 10. It will be readily appreciated by those skilled in the art that this recycling technique can, after a given time, establish an equilibrium condition within the stage 108 wherein nonvaporizable bottoms would be continuously withdrawn through line 138, while a recycle stream is continuously passed to the tank 122. Of course, a combination of tower flooding and tower surface heating could also be used if desired for proper temperature control.

It has been suggested in the past to employ gas/liquid cyclone separators in the refining of virgin oil ("The Application of Gas/Liquid Cyclones in Oil Refining", *Transactions of the ASME*, January 1958, by J. R. J. Van Dongen and A. J. Ter Linden, and "The Separation of Liquid From Vapor, Using Cyclones", *Transactions of the ASME*, January 1942, by Arthur Pollak and L. T. Work). Flash vaporization techniques are also described in "Flash Vaporization", *Chemical Engineering Progress*, February 1953 by R. R. Hughes et al. However, these prior proposals do not deal with rerefining of waste oil, nor do they in any way suggest the desirability of maintaining proper temperature conditions within the tower for enhancing production of distillate. As noted above, it has been found that the temperature condition should be such that the hydrocarbon vapors evolved from the whirling oil are maintained in a vapor state; on the other hand, the temperatures should not be sufficient to substantially decompose or crack the oil, since this interferes with the process. Hence, it will be seen that the problem of temperature maintenance cannot really be solved simply by preheating the oil prior to distillation to a level greatly in excess of the desired distillation temperature, since this in many instances will cause significant decomposition or cracking of the oil. As can be appreciated, cracking can cause coking of the process equipment and a decrease in ultimate yields.

In any event, as distillation proceeds, a bottoms fraction is drawn off from line 138 and recovered. This valuable product can be used in asphalts or greases, for example. Also, the vaporized hydrocarbons within subchamber 14a are conveyed through line 128, condensed in condenser 134, and recovered as a liquid.

The overhead from tower 10 can be condensed and used directly since a large proportion of the undesirable contaminants are already removed. However, if further purification is desired the distillate can be polished by any one of a number of conventional procedures. For example, the distillate can be filtered through clay or solvent extracted to give a clarified end product. In the case of solvent extraction, solvents such as nitrobenzene have proven to be highly successful in practice, although other organic solvents can also be used to good effect.

The following examples illustrate the operation of a commercial waste oil rerefinery using the tower and method of the present invention. However, nothing in these examples is to be taken as a limitation upon the overall scope of the invention.

EXAMPLE I

Approximately 10,800 gallons of waste oil derived from automotive crankcases was treated in accordance with the present invention. The oil was first dehydrated in a conventional dehydrator at about 230° F. and atmospheric pressure. The overhead (about 800 gallons) from this step was condensed with tap water and contained 95 to 98% water and a minor amount of gasoline and other light ends. The underflow oil had a temperature of about 150° F. and was directed to a settling tank.

The oil was next directed to a tube still heater and heated to a temperature of from 570 to 600° F., whereupon the heated oil was fed to a conventional unheated bubble cap fractionator. The oil was then treated in the fractionator at atmospheric pressure with countercurrent steam injection (350° F. saturated steam, 125 p.s.i.). The overhead from this operation amounted to about 8 to 10% of the total and was at a temperature of about 480 to 580° F. The overhead was condensed with tap water and contained about 3% $H_2O$, 95% No. 2 fuel oil and 2% light spindle oil. These components were then gravity separated and recovered. The fractionator bottoms were at a temperature of from about 480 to 520° F. and were sent to an insulated run down tank.

The dehydrated fractionated oil was next directed to a tube still heater and heated to a level of 680 to 720° F. The heated oil was then sent to the distillation tower described in detail herein. This tower was equipped with surrounding plate coils as illustrated in FIG. 1A. A fraction of the incoming waste oil was directed through the plate coil structure in order to heat the walls of the distillation tower. These walls were maintained at a level of about 600 to 620° F. by this means. This temperature was lower than desirable, and resulted in somewhat lower yields of overhead. The oil to be treated was fed to the tower at a rate of about 15 gallons per minute and was sprayed tangentially into the tower in order to facilitate flashing thereof and to impart a whirling or cyclone motion thereto. The conditions within the tower during processing were a pressure of from about 1.6 to 2.0 inches of mercury, absolute, and a hydrocarbon vapor temperature of from about 540 to 570° F. During processing, a substantial fraction of the oil was substantially instantaneously flash vaporized. These and later evolved vapors were maintained in the vapor state by virtue of the heating of the tower walls, and the vapors were taken overhead and condensed. The condensed oil had a viscosity of 45-47 ssu. at 210° F., and 180-230 ssu. at 100° F.; a viscosity index of 110-130; a color of No. 4 N.P.A.; a flash point of 380-450° F. C.O.C.; a pour point of from 0 to −10° F.; an A.P.I. gravity of 29.5 to 31°; and a very slight odor. The bottoms from the distillation tower were withdrawn at about 600° F. and had a viscosity of 200-350 ssu. at 210° F.; an A.P.I gravity of 19-22°; and a flash point of 525 to 575° F.

The condensed overhead was next treated with Filtrol No. 20 activated clay at 350° F. in order to polish the distilled oil. This resulted in about a 1 to 2% loss in oil. The final polished oil had an N.P.A. color of 2 to 2.5, no odor, and exhibited slightly increased viscosity, slightly lowered pour point, and an increased flash point. This product was eminently suitable for use as a lubricating oil.

EXAMPLE II

This example is similar to that of Example I, save for the fact that in the distillation step the tower was flooded with an excess of oil for heat maintenance purposes.

In particular, all of the steps involved in dehydration and intermediate fractionation were exactly as described in Example I. However, during the distillation step the feed flow to the tower was tripled to about 45 gallons per minute in order to maintain the wall temperature of the tower at a level from about 680 to 690° F. This resulted in a hydrocarbon vapor temperature in the tower of from about 655 to 670° F. Pressure conditions within the tower ranged from about 0.8 to 2.4 inches of mercury, absolute.

The overhead from the tower had the following characteristics: a viscosity of 47-49 ssu. at 210° F. and 200-250 ssu. at 100° F.; a V.I. of 110-130; No. 4 N.P.A. color; a flash point of 410-450° F. C.O.C.; a pour point of 0 to −10° F.; an A.P.I. gravity of 28.5 to 30.5°; and a very slight odor. The bottoms were withdrawn at a temperature of 565-600° F. and had a viscosity of 500-750 ssu. at 210° F.; an A.P.I. gravity of 13.5 to 15°; and a flash point of 590 to 620.

The overhead distilled oil from the tower was not subjected to a further polishing step, but rather was used as a railroad journal box lubricant. The bottoms were used as asphalt extenders.

In additional runs, various other types of waste oils such as diesel engine lubricating oils were treated in a manner similar to that described in the examples. These oils were likewise cleaned and rerefined to a relatively high degree of purity.

Having thus described the invention, what is claimed as new and desired to be secured by Letters Patent is:

1. A cyclonic distillation tower for treating waste oil having high boiling point impurities therein, said tower comprising:
   structure defining an elongated, upright, enclosed chamber presenting a substantially cylindrical upper vapor zone defined at least in part by a substantially cylindrical sidewall and a top wall, and a lower liquid collection zone, said chamber being constructed for maintenance of equal pressure conditions within said zones during operation of said tower;
   flowing-directing means for supplying said waste oil to said chamber, for imparting a whirling motion to the waste oil as the latter enters the chamber, and for enhancing the vaporization of a major proportion of said waste oil from said high boiling impurities to yield a recoverable product, including
   a tangentially disposed inlet through said sidewall defining said upper zone and in communication with the latter;

nozzle means operatively disposed adjacent said inlet for tangentially spraying said waste oil into said upper zone;

substantially tubular baffle structure positioned radially inwardly from and adjacent to said inlet and extending downwardly therefrom which presents an annular confining space between the baffle structure and said defining sidewall of said upper zone for directing said waste oil sprayed into said upper zone, and the major proportion vaporized therefrom along a generally circular whirling path;

means for maintaining the temperature conditions within said chamber at a level for maintaining said vaporized major proportion of waste oil in the vapor state in the upper zone;

means for creating negative pressure conditions within said upper zone, said flow-directing means, temperature-maintaining means and negative pressure-creating means cooperatively serving to flash vaporize from about 50 to 95% of said waste oil as the waste oil enters said upper zone for ensuring a high degree of separation of said vaporized oil from said high boiling impurities;

vortex-breaking structure disposed within said chamber generally between said zone for preventing entrainment of the nonvaporized high boiling impurities into said vaporized major proportion of said waste oil, said vortex-breaking structure also being spaced from said nozzle means a distance for ensuring complete separation between the vaporizable proportion of said waste oil and said high boiling impurities;

means in communication with said liquid collection zone for withdrawal of liquids collected therein; and means in communication with said vapor zone for withdrawal of the vaporized proportion of said waste oil, including a tubular outlet conduit generally centrally and axially disposed within said upper zone which extends through said top wall and into said upper zone.

2. The tower as set forth in claim 1 wherein said temperature-maintaining means includes apparatus disposed about at least a portion of said chamber-defining structure for heating the same.

3. The tower as set forth in claim 1 wherein said apparatus comprises electrical heating tape.

4. The tower as set forth in claim 1 wherein said apparatus comprises coil structure disposed about at least a portion of said chamber-defining structure and adapted to receive a heat-exchange medium.

5. The tower as set forth in claim 1 wherein said temperature-maintaining means includes apparatus for flooding said chamber with an excess of hot waste oil, and for recycling at least a portion of the excess waste oil passing through the tower back to said hot oil-supplying means.

6. The tower as set forth in claim 1 including:

partition means within said chamber directly below said vortex-breaking structure for dividing the latter into first and second vertically adjacent subchambers; and means for allowing flow of oil from said first to said second subchamber, and for equalizing pressures within the subchambers.

7. The tower as set forth in claim 6 wherein said oil flow and pressure-equalization means includes structure defining an aperture through said partition means, and a conduit respectively in communication with said first and second subchambers.

* * * * *